United States Patent
Bossel

(10) Patent No.: US 6,344,290 B1
(45) Date of Patent: Feb. 5, 2002

(54) FUEL CELL STACK WITH SOLID ELECTROLYTES AND THEIR ARRANGEMENT

(75) Inventor: Ulf G. Bossel, Oberrohrdorf (CH)

(73) Assignee: Fucellco, Incorporated, Wilmington, DE (US)

(*) Notice: Subject to any disclaimer, the term of this patent is extended or adjusted under 35 U.S.C. 154(b) by 0 days.

(21) Appl. No.: 09/367,317

(22) PCT Filed: Jan. 29, 1998

(86) PCT No.: PCT/CH98/00034

§ 371 Date: Aug. 11, 1999

§ 102(e) Date: Aug. 11, 1999

(87) PCT Pub. No.: WO98/35398

PCT Pub. Date: Aug. 13, 1998

(30) Foreign Application Priority Data

Feb. 11, 1997 (CH) .................................. 296/97

(51) Int. Cl.[7] .................................. H01M 8/10
(52) U.S. Cl. ............................. 429/38; 429/32
(58) Field of Search .................. 429/30, 34, 31, 429/32, 38

(56) References Cited

U.S. PATENT DOCUMENTS

| | | |
|---|---|---|
| 3,861,959 A | 1/1975 | Cadiou |
| 5,338,621 A | 8/1994 | Bossel |
| 5,399,442 A | 3/1995 | Shundo |
| 5,445,903 A | 8/1995 | Cable et al. |
| 5,484,666 A | 1/1996 | Gibb et al. |
| 5,514,486 A | 5/1996 | Wilson |
| 5,549,983 A | 8/1996 | Yamanis |

FOREIGN PATENT DOCUMENTS

| | | |
|---|---|---|
| DE | 43 33 478 | 8/1994 |
| EP | 0 355 420 | 2/1990 |
| EP | 0 437 175 | 7/1991 |
| JP | 023004870 | 12/1990 |
| WO | 86/06762 | 11/1986 |

*Primary Examiner*—Gabrielle Brouillette
*Assistant Examiner*—M. Wills
(74) *Attorney, Agent, or Firm*—Venable; Gabor J. Kelemen; Chad C. Anderson

(57) ABSTRACT

Portable fuel cell arrangement comprising fuel cells in the form of discs for axial layering in a stack which is fixed by a tie rod, wherein the fuel cell has an opening to hold the tie rod and to form an inlet for a first gas, and comprises: a high-temperature ceramic electrolyte or a low-temperature polymer electrolyte; a porous cathode layer or a porous anode layer on each side of the electrolyte; a gas-permeable substrate having channels for carrying gases; a small separating plate located at least partially on the first surface of the substrate a large, separating plate which is located on the second surface of the substrate and comprises means for carrying gases in a controlled manner. The large separating plate may comprise means for carrying gases run along continuous lines, have no branches and do not run in the radial direction or in the tangential direction, and described by the formula $$\phi = \pm A\{[(r/r_0)^2 - 1]^{0.5\,:\,-B} \arctan[(r/r_0)^2 - 1]\}.$$

24 Claims, 13 Drawing Sheets

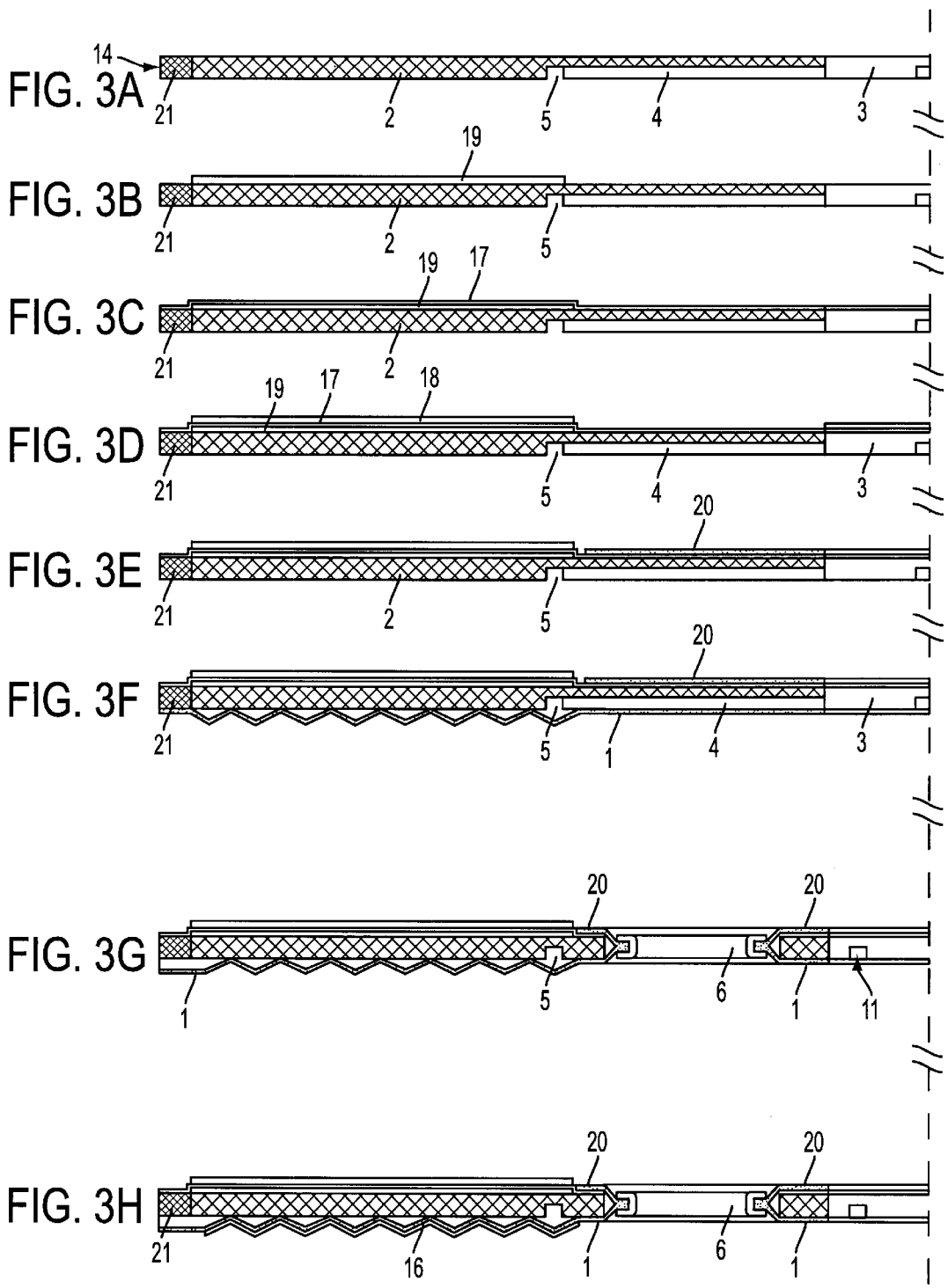

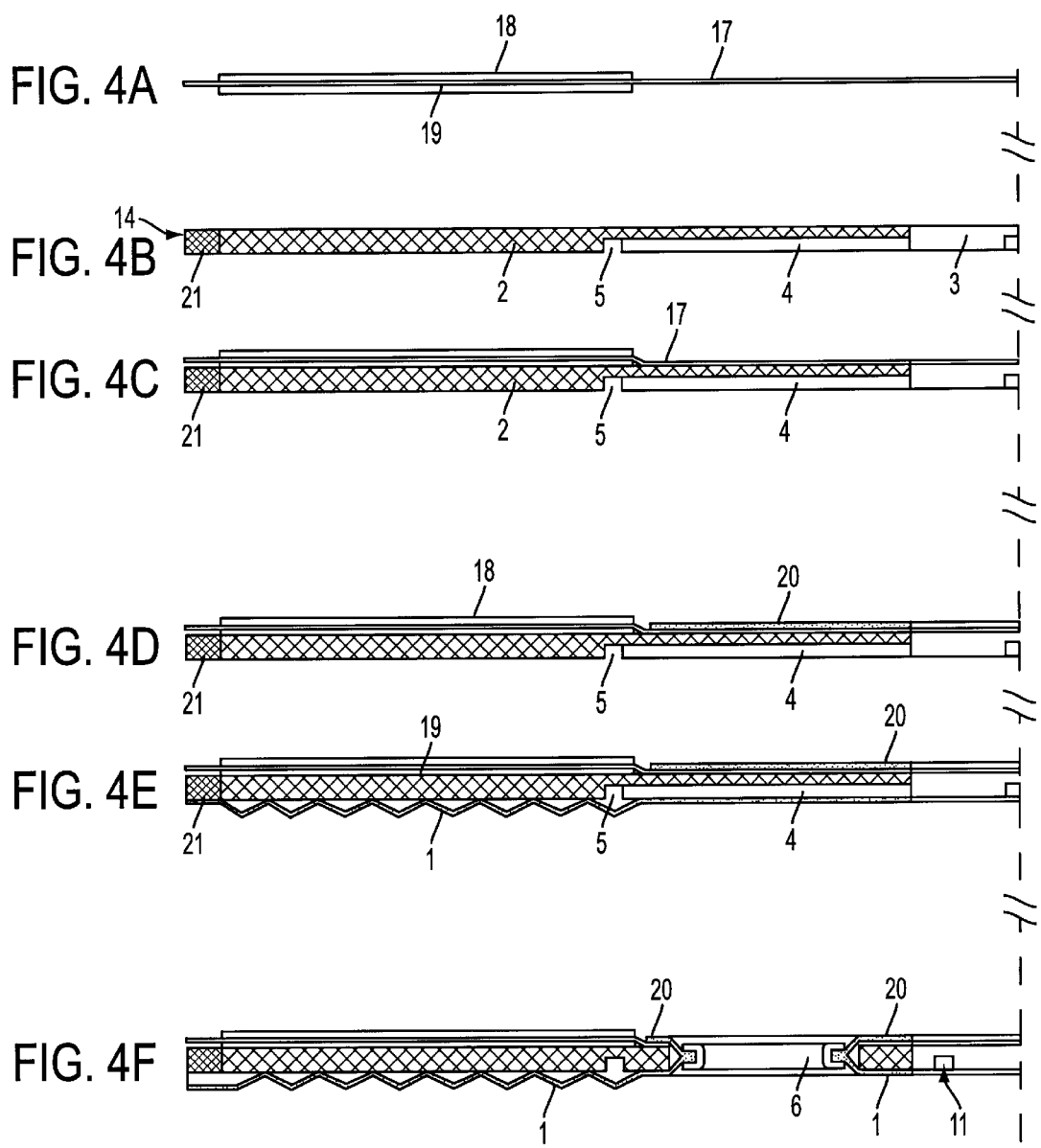

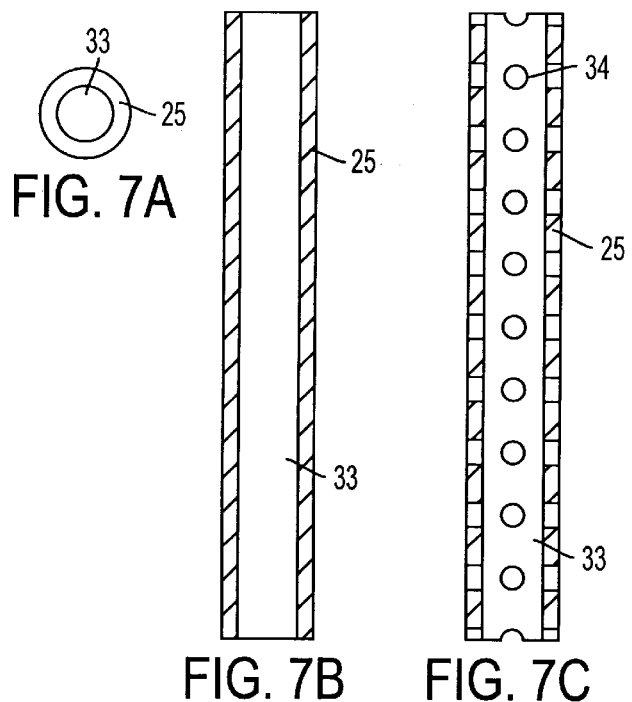
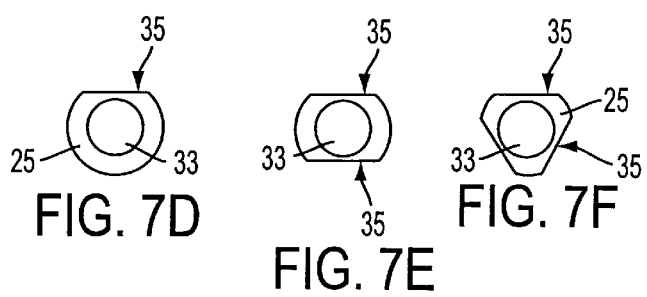
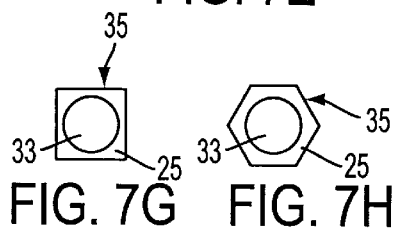
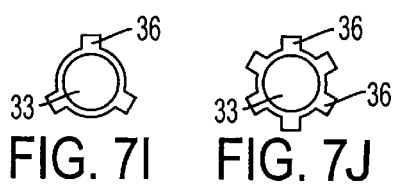
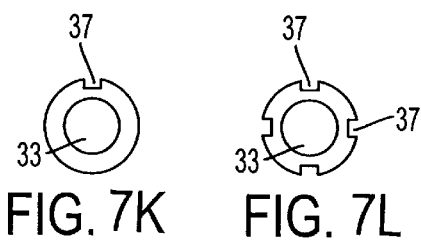

FUEL CELL STACK WITH SOLID ELECTROLYTES AND THEIR ARRANGEMENT

BACKGROUND OF THE INVENTION

The invention relates to a fuel cell in the form of plates for producing direct current by electrochemical conversion of hydrogen and fuel gases containing carbon, as well as relating to a portable fuel cell arrangement comprising a stack of such, preferably circular, fuel cells having a high-temperature ceramic electrolyte or a low-temperature polymer electrolyte. The fuel cell arrangement is distinguished by a high power density and space utilization, as well as high efficiency.

Fuel cells having high-temperature ceramic electrolyte as well as those having low-temperature polymer electrolyte are electrochemical appliances, by means of which the chemical energy of a fuel can be converted directly into electrical direct current. Corresponding apparatuses are approaching the stage of readiness for industrial production. Thanks to their efficiency and environmental friendliness, they could very soon partially replace the traditional thermal machines.

Fuel cells having ceramic solid electrolytes have been known for a relatively long time from numerous publications. A large number of arrangements, whose geometries differ from one another, have already been proposed for interconnecting a multiplicity of fuel cells. Designs exist in the form of tubes, rings, corrugations or plates. The latter are based on a filter press, where flat, planar components are arranged in rows to form stacks, and are compressed with one another by means of one or more tie rods.

As a rule, fuel cells are operated with excess fuel. The gas which is not converted has to be burnt downstream from the fuel cell. Elements developed in gas engineering, such as electrical igniters, flame monitors and emergency disconnection, are used for this purpose.

Many options have been investigated for transferring the electrical current from cell to cell. This is no easy task owing to the high operating temperatures in fuel cells with ceramic solid electrolytes, and owing to the oxidizing atmosphere on the oxygen side. For arrangements in the form of plates, the current is carried, as a rule, via electrical connectors at right angles to the plane of the plate within the active space. An alternative connection from cell to cell by means of metallic connecting elements outside the active space in the cell has been proposed, for example, in U.S. Pat. No. 5,338,621.

Some of these configurations in the form of plates are formed from circular individual cells and are disclosed, for example, in EP-A-0 355 420, EP-A-0 437 175, U.S. Pat. No. 5,399,442 and DE 43 33 478, WO-A-86/06762, U.S. Pat. No. 5,445,903. These individual cells are generally supplied with fuel from the inside through at least one channel, which is formed by openings positioned one behind the other. This channel must be sealed as it passes through the layers that carry air, as is evident, for example, from EP-A-0 355 420 or WO-A-86/06762.

In EP-A-0 355 420, WO-A-86/06762 or U.S. Pat. No. 5,399,442 and DE 43 33 478, air, for example, is supplied as the oxidant from the inside by means of at least one channel. In this case, sealing must be provided to prevent air from escaping into the layers carrying the fuel.

An embodiment is disclosed in EP-A-0 437 175, in which reaction air is supplied from the exterior. As a rule, the fuel and air channels in the cell are sealed such that none of these gases can enter the gas space of the other.

The production of the ceramic functional layers comprising the anode, electrolyte and cathode by means of gas flame spraying or plasma spraying onto porous ceramic or metallic substrates is disclosed, for example, in WO-A-86/06762. Furthermore, suitable substrates, one of whose surfaces is coated with ceramic or metallic material, are commercially available. Nickel felt mats, for example, are used for industrial production of fuel cells, coated with nickel powder on one side. The electrolytic layers are then deposited on the surface coated in this way by physical processes (gas flame spraying, plasma spraying, sputtering etc.).

Furthermore, the use of a single tie rod, which is arranged along the cylinder axis, is prior art for a cylindrical arrangement. In arrangements of a related type (for example multilayer filters), centrally arranged tie rods are used. The use of springs between a tie rod and pressure plates to produce a contact pressure which is virtually constant even at different temperatures is also known and is general engineering practice. U.S. Pat. No. 5,514,486 discloses tie rods in fuel cells, which are composed of a single solid material and are used exclusively to compress the cell stack. They are always electrically insulated from all live parts.

For example, U.S. Pat. No 5,514,486 likewise discloses the use of Dow or Nafion membranes as a polymer electrolyte layer. According to this document, one reaction gas is supplied via a central channel and can be diffused towards the periphery of the rotationally symmetrical fuel cell stack, while the other reaction gas enters the fuel cell stack at the periphery, and diffuses towards the centre.

A major problem in a stack of fuel cells is the routing and distribution of the reaction gases. Labyrinths have been proposed, for example in U.S. Pat. No. 5,399,442 and DE 43 33 478 or EP 0 355 420 for influencing the distribution of the gases in an at least approximately rotationally symmetrical stack. These labyrinths are essentially composed of radial apertures and tangential or concentric partially circular channels, which are connected to one another.

On the one hand, the path starting from a region of the fuel cells close to the centre to their periphery is not continuous for the reaction gases: for example, FIG. 1 in EP 0 355 420 or FIG. 8 in U.S. Pat. No. 5,399,442 or DE 43 33 478 shows that, as a result of its radial movement in the region of the radial apertures, a gas strikes the side walls—which are positioned transversely with respect to the movement at that stage—of the concentric channels and is correspondingly caused to swirl. Once the gas flow has been split into two opposite directions, these flow elements each as strike an adjacent flow element in the region of the next radial aperture. These processes are repeated until the gas has reached the periphery. However, the complicated movement of the gases in no way ensures that they are uniformly distributed. It must therefore be expected that the swirling of the gases when they strike obstructions or meet other flow elements causes a random gas flow which results in a gas distribution that differs greatly from the optimally uniform distribution of the reaction gases. This can lead to local hot spots occurring in the fuel cell or fuel cell stack. As is known, such hot spots have an extremely detrimental effect on correct fuel cell operation. Undesirable pressure losses can also be caused by such changes in the gas flow direction.

On the other hand, the path starting from a region of the fuel cells close to the centre to their periphery is continuous for the reaction gases: for example, FIG. 5 in EP 0 355 420 shows that a gas is intended to carry out a radial movement from a region outside the centre of the fuel cell to its periphery. This eccentric arrangement of the gas inlet leads to a non-homogeneous distribution of reaction gases. Furthermore, in this embodiment, the channels for carrying the gas become much wider towards the periphery which—owing to the increase in the flow cross section—leads to the gas flow slowing down. However, such slowing down is undesirable, since this contributes to a major reduction in the gas reaction. An alternative, continuous gas supply has also been proposed in EP 0 355 420 (FIG. 6), in which the reaction gases move on a spiral from a region close to the centre towards the periphery of the fuel cell. This now actually results in a continuous movement; the length of the path may now, however, have a disadvantageous effect: once again, it results in a severe reduction in the gas reaction, since the concentration of the unused gases reduces, of course, with the length of the path travelled.

SUMMARY OF THE INVENTION

A first aspect of the object of the invention is to propose a light and compact fuel cell based on plate elements with a high-temperature ceramic electrolyte or low-temperature polymer electrolyte. According to a second aspect of the object, the intention is to provide a corresponding fuel cell arrangement composed of the fuel cells according to the invention. In this case, the intention is to achieve a more uniform reaction or current distribution within each cell and uniform current transmission between two adjacent cells, at right angles to the plane of the plates, with the gaseous media in the region of the electrodes being supplied and carried away as continuously as possible and in as clear a manner as possible—while as far as possible avoiding direction changes.

According to the invention, the first aspect of this object is achieved by a fuel cell in the form of discs for axial layering in a stack. The stack is fixed by a tie rod and the fuel cell has an opening to hold the tie rod and to form an inlet for a first gas, and is characterized in that the fuel cell comprises: an ion-conducting electrolyte in the form of a high-temperature ceramic electrolyte or a low-temperature polymer electrolyte; a porous cathode layer as an oxygen electrode or a porous anode layer as a fuel electrode on each side of the electrolyte; a gas-permeable substrate having a first and a second surface and having channels for carrying gases; a small separating plate which is located at least partially on the first surface of the substrate; a large, electrically conductive separating plate which is located on the second surface of the substrate and comprises means for carrying gases in a controlled manner, which gases interact with the channels in the substrate.

According to the invention, the second aspect of this object is achieved in that an arrangement of fuel cells is proposed which is characterized in that the fuel cells are layered axially in a stack, which is fixed by at least one tie rod—which acts between an initial plate and an end plate—wherein each tie rod is surrounded by at least one electrically insulating rentring sleeve, such that the first gas can flow through the space between the tie rod and the sleeve, as well as the space between the sleeve and the edge of a channel—which is formed by the stack of fuel cells, and that the second gas can flow through the space which is formed by the apertures (which are placed one above the other in a grid) in the opposite contact regions of the separating plates.

Furthermore, a method is proposed for producing these fuel cells and this arrangement of fuel cells.

BRIEF DESCRIPTION OF THE DRAWINGS

Exemplary embodiments are illustrated in the drawings, in which:

FIGS. 1b, c show section illustrations of a fuel cell along the section lines A-O and B-O, respectively, in FIG. 1a;

FIGS. 3a–h shows a section illustration with assembly steps for a fuel cell having a high-temperature ceramic electrolyte;

FIGS. 4a–f shows a section illustration with assembly steps for a fuel cell having a low-temperature polymer electrolyte;

FIGS. 7a–l show section illustrations of alternative centering sleeves.

DETAILED DESCRIPTION OF THE INVENTION

Figure 1A:
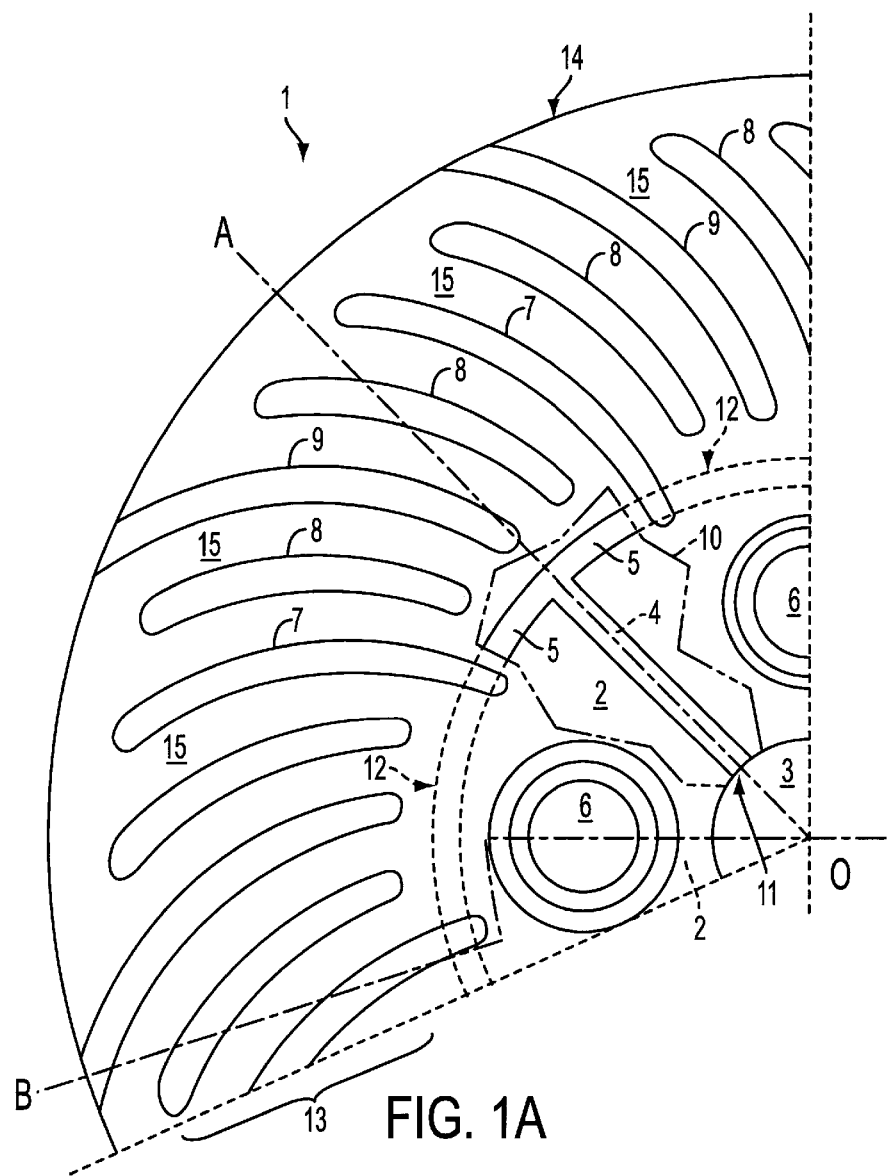
FIG. 1a shows a plan view of a part of the separating plate of a fuel cell, in combination with a gas-permeable substrate underneath it, corresponding to a first embodiment.

FIG. 1a shows a large separating plate 1 in the form of a circular disc. The separating plate 1 is positioned underneath a gas-permeable substrate 2, which is likewise in the form of a circular disc. An opening 3, which is preferably likewise circular and arranged concentrically, is located at the common centre of the separating plate 1 and of the substrate 2. At least one radial channel 4, which is incorporated in the substrate 1, connects the central opening 3 to an annular channel 5, which is likewise incorporated in the substrate. Both the large separating plate 1 and the substrate 2 have at least one aperture 6 in the region close to the centre. In this case, the separating plate 1 and the substrate 2 are preferably positioned on one another such that a round aperture 6 in the separating plate 1 is in each case located concentrically on a round aperture 6 in the substrate 2. The separating plate 1, the substrate 2, the opening 3 and the apertures 6 may have a shape that is not circular. They may also, individually or jointly, have, for example, a polygonal, oval, kidney or elliptical shape, or a combination of one or more of the shapes described above. The substrate 2 shown here is produced integrally. A further embodiment comprises the substrate 2 being constructed from a plurality of preferably identical piece parts.

On its side facing the substrate 2, the separating plate 1 has channels or depressions, which are shown by solid lines in FIG. 1a. These represent means for controlled routing of gases and, in this case, comprise a multiplicity of inlet-flow channels 7, pressure-equalizing channels 8 and outlet-flow channels 9. The radial channel 4 and a part of the annular channel 5 are likewise represented by solid lines, since they are visible in the cutaway region bounded by the cutaway line 10.

A first gas which flows in through one of the inlet openings 11 from the opening 3 now passes via one of the radial channels 4 into the annular channel 5, by which means this first gas is distributed over a front 12. Each fuel cell has at least one inlet opening 11, which opens into a radial channel 4. There are preferably a plurality of inlet openings 11 and radial channels 4 in each fuel cell. In this exemplary embodiment, there are four inlet openings 11 in each fuel cell, which open in an annular channel 5 that forms a circular front which is concentric about the centre of the fuel cell. In other embodiments, either fewer or more than four radial channels may also be provided in each fuel cell and, like the separating plate 1, the substrate 2, the opening 3 and the apertures 6, this front may have a shape which is not circular.

The first gas passes from the front 12 into the inlet-flow channels 7, which extend over the annular channel 5 and start abruptly. The first gas is transferred through these inlet-flow channels 7 to this front 12 and is passed in a controlled manner through a diffusion zone 13 in the direction of the periphery 14 of the fuel cell. The outer edge of the diffusion zone 13 is in this case essentially defined by the abrupt ends of the inlet-flow channels 7.

The outlet-flow channels 9 start abruptly at a distance from the front 12, and their starting points essentially define the inner edge of the diffusion zone 13. The outlet-flow channels 9 carry the substantially consumed first gas—without coming into contact with the inlet-flow channels 7—in a controlled manner to the periphery 14 of the fuel cell, where these channels 9 end open. Pressure-equalizing channels 8 may be located between the inlet-flow channels 7 and the outlet-flow channels 9 in the region of the diffusion zone 13. These channels 8 advantageously start abruptly at the inner edge of the diffusion zone and end, likewise abruptly, at the outer edge of the diffusion zone 13. On their continuous path through the diffusion zone 13, the pressure-equalizing channels 8 do not come into contact with either the inlet-flow channels 7 or the outlet-flow channels 9. In FIG. 1a, a pressure-equalizing channel 8 is in each case located between an inlet-flow channel 7 and an outlet-flow channel 9; however, there may also be 2, 3 or more pressure-equalizing channels 8, or they may be dispensed with completely.

If, for example, the separating plate 1 in FIG. 1a is a stamped or pressed metal sheet, or a metal sheet formed in some other way, into which the channels 7 to 9 are formed, these channels form projections or walls on the side of the separating plate 1 facing away from the substrate 2. These walls are at a distance from one another and expose a multiplicity of through-channels 15, which are used as means for carrying a second gas in a controlled manner. An advantageous gas distribution in the diffusion zone 13 has been achieved by designing the channels 7, 8 and 9 as well as 15 such that their profile, in polar coordinates, can be described by the formula $$\phi = \pm A\{[(r/r_0)^2-1]^{0.5} - B \arctan[(r/r_0)^2-1]\} \quad [1]$$

where A>0 (not running strictly radially) and B>0 (not running strictly in a circular shape), so that this results in all the lines running in one rotation direction.

In the formula [1]:
$\phi$=angle measured from a reference line passing through the origin
r=variable radius, measured from the origin
$r_0$=reference radius, measured from the origin One profile of these channels 7 to 9 and 15 was advantageously such that, in the formula [1], 0<A<2 and 0<B<2. In an embodiment of the large separating plate 1 which has been found to be particularly advantageous, the inlet-flow channels 7, the pressure-equalizing channels 8, the outlet-flow channels 9 and the through-channels 15—that is to say all the means for controlled routing of gases—run along the lines which can be described by the circular involute, formula [1] with A=1 and B=1. Despite their curvature, these lines always run at a uniform distance from one another, thus resulting in flow channels of the same width. The fuel cells can be stacked such that the rotation direction of all the means 7, 8, 9, 15 which carry gas in a fuel cell runs in the opposite rotation direction or in the same rotation direction as at least one of the adjacent cells. Such channel patterns may also have other basic geometries, such as ellipses or polygons, whose involutes can likewise form lines which are at uniform distances from one another and have no branches, thus forming flow channels with the same width. The scope of the invention also includes, of course, all continuous and/or non-continuous lines which approximate to these curves, by means of which channels of at least approximately uniform width can be described, as well as channels whose width converges or diverges increasingly in the flow direction of the gases.

Figure 1B:
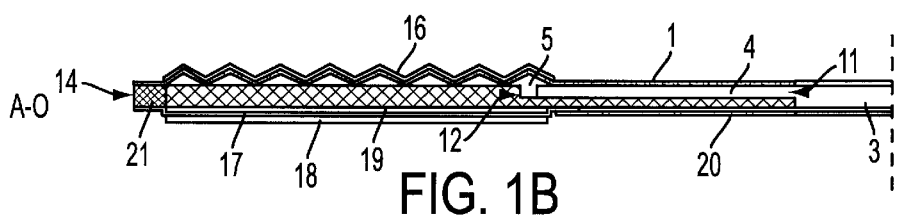
Figure 1C:
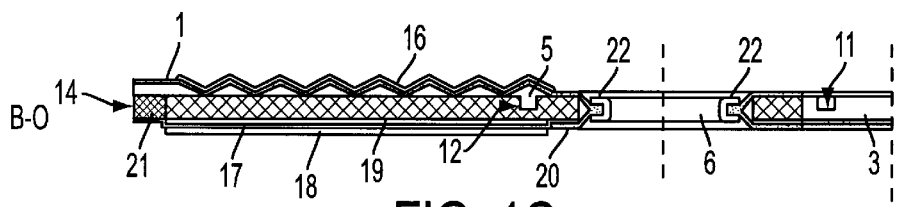

FIG. 1b shows a cross section through a fuel cell according to the invention along the section line A-O in FIG. 1a. A protective layer 16 which is impermeable to oxygen but is electrically conductive is deposited on the side of the separating plate 1 facing away from the substrate 2, is composed of perovskite or a noble metal, and is intended to protect the separating plate 1 from the corrosive second gases, for example from $O_2$. While the large separating plate 1 is located on a second surface of the substrate 1, the electrolytically active layer, which is formed from the three layers comprising the anode 19, electrolyte 17 and cathode 18, is located on the first surface of the substrate 1. The anode 19 in this case faces the substrate 2, and is electrically connected to it. In the case of a high-temperature ceramic electrolyte, composed, for example, of doped zirconium oxide, it is normal to use a ceramic-metal mixture, for example a nickel/zirconium oxide/cermet as the anode, and a mixed oxide or perovskite as the cathode. In the case of a low-temperature polymer electrolyte composed, for example, of Nafion, the anode and cathode are generally in the form of thin platinum layers. In a complementary manner to this, FIG. 1c shows a cross section through a fuel cell along the section line B-O in FIG. 1a. This section is positioned such that, unlike that in FIG. 1b, it does not run through a radial channel 4 and the corresponding inlet opening 11, but, after intersecting the front 12 and the annular channel 5, passes through an aperture 6 and ends in the centre of the fuel cell and of the opening 3. The substrate is preferably produced from a porous, gas-permeable and electrically conductive material, for example from metal felt, metal foam or a cermet. There is also a small separating plate 20 on the same first side of the substrate 2 as the electrolyte 17. The large and small separating plates 1, 20 are separated from one another by the substrate 2 located in between. Close to the opening 3, which is common to all three of these, the two separating plates 1 and 20 are shaped such that they form at least a mutual contact region 22 and, in this contact region 22, have at least one aperture 6 for a second gas to be passed through in the axial direction. The substrate 2 has cutouts, of course, in the area of these contact regions between the two separating plates. On its periphery 14, the substrate preferably has an edge region 21 which is at least partially compressed and thus impedes the first gas from having a free outlet from the porous, gas-permeable substrate 2.

Figure 2:
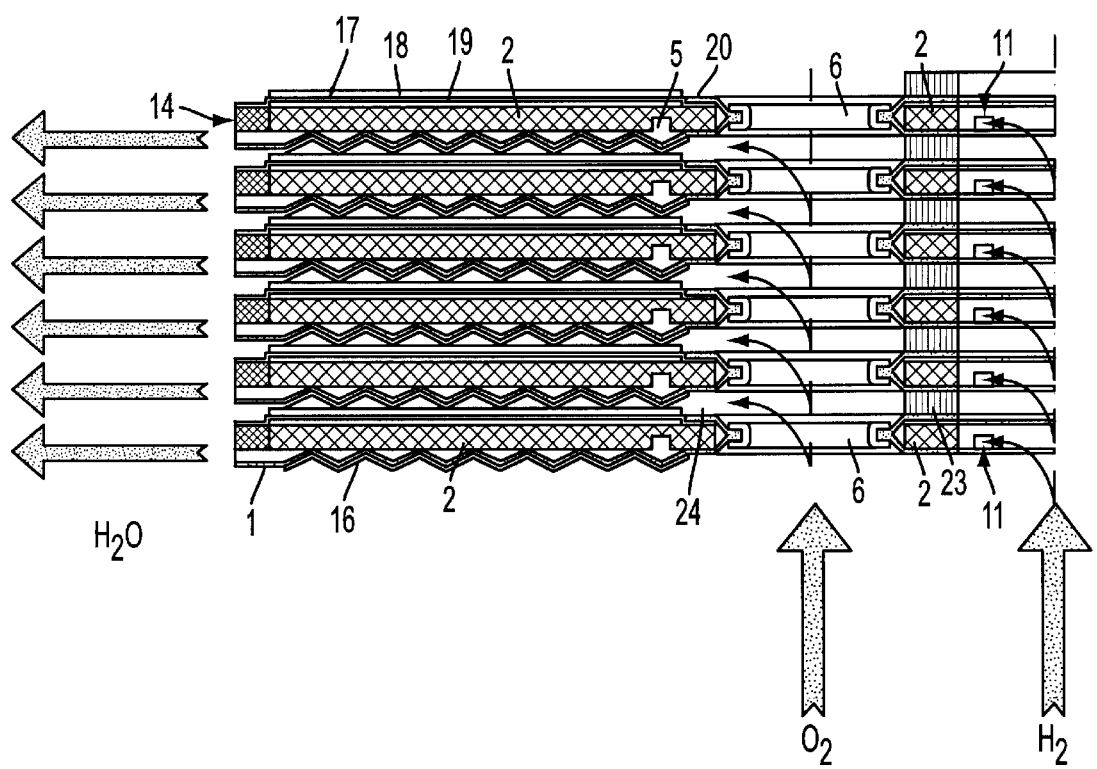
FIG. 2 shows a section illustration of an arrangement of fuel cells in the form of a stack, showing the gas flows.
Figure 5A:
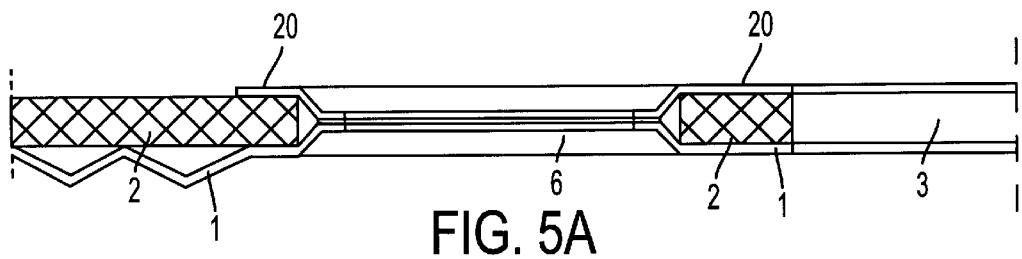
FIGS. 5a–d show section illustrations of alternative embodiments of the connection of the large and small separating plate.
Figure 5B:
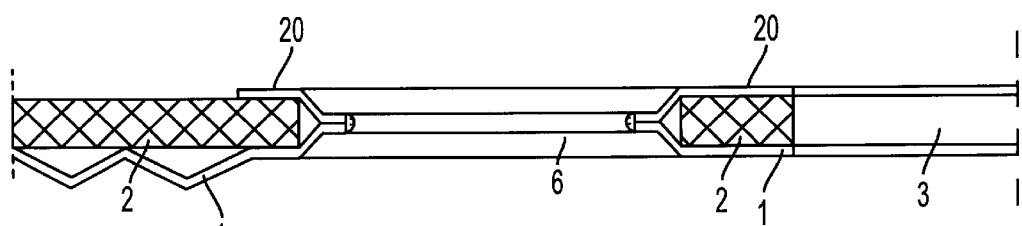
Figure 5C:
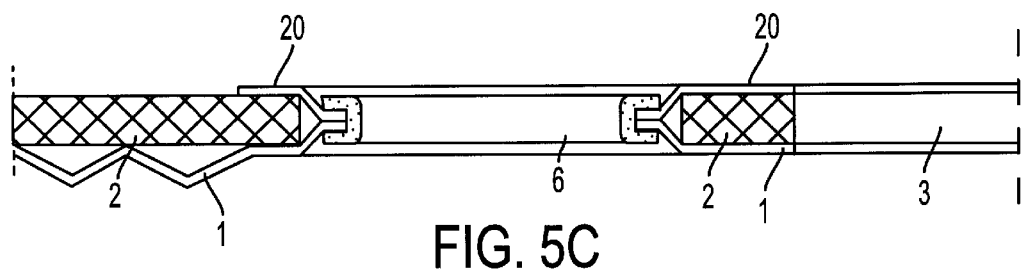
Figure 5D:
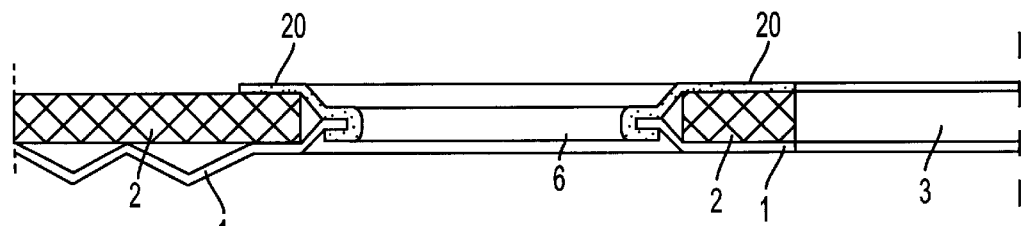

FIG. 2 shows a section illustration of an arrangement of fuel cells in the form of a stack, showing the flows of a first gas, a fuel gas (for example hydrogen, $H_2$), and of a second gas, an oxidant (for example oxygen, $O_2$) as well as the outlet of the reaction product (for example water vapour, $H_2O$) In comparison with the illustrations in FIGS. 1b and 1c, the fuel cells are in this case shown in the opposite manner, that is to say the substrates 2 are located on the large separating plate 1. The fuel gas is supplied through the centrally arranged openings 3. These openings together form a central channel, which runs parallel to the axis of the stack of fuel cells and of the fuel cell arrangement. The fuel gas passes through the inlet openings 11 into the radial channels 4, and then into the annular channel 5, which are all incorporated in the substrate 3. From the front 12, the fuel gas can now continue on its path in the radial direction only through the porous, gas-permeable substrate 2. However, since the inlet-flow channels 7 in the large separating plate 1 extend over the annular channel 5 and thus the front 12 as well, the fuel gas can enter these inlet-flow channels 7 without any impediment and is passed on through these, specifically and quickly, in the direction of the periphery 14. However, since these inlet-flow channels end abruptly, a slight overpressure is produced in the fuel gas, which results in the fuel gas entering the gas-permeable, porous substrate 2 along the entire inlet-flow channel 7, and on both sides of it. This essentially tangential, relatively slow movement continues until the fuel gas flows into a pressure-equalizing channel 8, which runs essentially transversely with respect to this movement. After passing through the pressure-equalizing channel 8—and/or after a rapid movement which is essentially parallel to the pressure-equalizing channel 8 and within it towards the periphery or towards the centre of the stack—the fuel gas once again enters the gas-permeable substrate 2, and once again flows relatively slowly and essentially transversely with respect to the pressure-equalizing channel 8, until it enters the outlet-flow channel 9 and can flow without any impediment and quickly within this channel towards the periphery 14, where it can emerge from the stack. The regions in which the fuel gas flows slowly and essentially tangentially are substantially located between the inner and outer end of the pressureequalizing channels, and are referred to here as the diffusion zone 13.

When a high-temperature ceramic electrolyte is used, the fuel gas may be, for example, hydrogen ($H_2$), carbon monoxide (CO) or methane ($CH_4$). The reaction with the oxygen ions ($O^{--}$) coming from the cathode takes place in the porous anode. The exhaust gases that are produced, water vapour ($H_2O$) or carbon dioxide ($CO_2$), thus remain on the fuel gas side and flow through the diffusion zone 13 to the outlet-flow channels 9 through which, together with any fuel gas residues, they leave the fuel cell at the periphery 14.

However, only hydrogen ($H_2$) can react with a low-temperature polymer electrolyte. This hydrogen moves in the form of the form of protons ($H^+$) from the anode of the electrolyte membrane to the cathode, where oxidation to form water vapour ($H_2O$) takes place. The water vapour flows together with the remaining air via the outer channel structure and the through-channels 15 to the periphery 14 of the fuel cell. Unused hydrogen and any fuel gas additives or impurities pass through the diffusion zone 14 of the substrate plate 2 to the outlet-flow channels 9, through which they leave the fuel cell at the periphery 14.

In the region of this periphery 14, both the fuel gases and the exhaust gases are prevented or at least impeded by at least partially compressed edge regions 21 of the substrate 2 from emerging directly from the fuel cells, thus resulting in a gas flow essentially in the direction of the outlet-flow channels 9. The substrate is designed to be porous in the region of the channels 4 and 5 as well, of course, so that this ensures that the fuel gas has access to the anode here as well; the entire diffusion zone 13 is thus supplied virtually uniformly with fuel gas, which results in a uniform distribution of the reaction at the anode, and thus a uniform current distribution in the plane of a fuel cell and a high mean power per unit area.

The individual fuel cells are located one on top of the other such that an annular seal 23 located between two fuel cells in each case closes the central channel off from the periphery. The two gas spaces are thus separated from one another by the seal 23—or by a multiplicity of such seals 23 in a stack. Fuel gas flows through the inner, first gas space formed in this way.

The second gas, for example the oxygen ($O_2$) or a gas containing oxygen (air), is supplied through the apertures 6, which are arranged in the region close to the centre, to the individual fuel cells in a cell stack. These apertures each jointly form a channel, which runs parallel to the axis of the stack of fuel cells or of the fuel cell arrangement, and outside the annular seal 23. The oxygen, which may be present, for example, in pure form or equally well as a component of the ambient air, passes through the free intermediate spaces into the through-channels 15 which are defined by the projections in the large separating plate 1 and the porous cathode layer which is located on the projections, and run in a continuous line towards the periphery 14 of the fuel cells. A multiplicity of apertures 6—in the present exemplary embodiment arranged on a circle concentrically about the central opening 3—allow all the fuel cells to be intensively supplied with oxygen. An excess amount of this second reaction gas is preferably offered, thus resulting in a optimum efficiency as a result of a maximum reaction with the fuel gas. In order that the large separating plate 1 is protected against oxidation, it has a protective layer 16, which is impermeable to oxygen but is electrically conductive, on the surface which faces the oxygen cathode.

In principle, the first gas could be interchanged with the second gas, so that the oxidant can pass through the central opening 3 and the inlet openings 11 into the radial channels 4, and through the annular channel 5 to the front 12, where it is passed via the inlet-flow channels 7, the substrate 2 and the pressure-equalizing channels 8 and outlet-flow channels 9 to the periphery 14 of the fuel cell. The fuel gas would then flow through the apertures 6 in the axial direction, and would reach the periphery 14 via the through-channels 15. The two electrode layers would then, of course, also have to be interchanged in a corresponding manner.

A further, alternative route for the gas comprises supplying the second gas (oxygen or gas containing oxygen) via the periphery, where it enters the through-channels 15 and passes along them—in the opposite direction—to the apertures 6 in the stack, whereupon—after flowing through the apertures 6 in the axial direction—it leaves the fuel cell arrangement via the connection 28. In order to ensure the flow of the second gas, the entire stack of fuel cells is, for example, placed in a pressure chamber, thus allowing the oxidant to emerge freely into the atmosphere. The oxidant can also be sucked out via the connection 28.

Assembly of a fuel cell comprises the use of essentially two types of electrolyte:

1. High-temperature ceramic electrolyte (FIG. 3):
   a) A porous or gas-permeable substrate 2 composed, for example, of a sintered metal powder or metal fibre felt is formed to the desired thickness and shape and represents a current collector (fuel side) having a gas-permeable metal layer with a sintered-on surface which has a fine grain size but has open pores. These are preferably circular discs, but wafers whose shape is not circular could also be used. The opening 3, the radial channels 4 and the annular channel 5 as well as the apertures 6 are incorporated in the substrate by means of, for example, drilling, milling, pressing or stamping, and the edge region 21 is at least partially compressed in the vicinity of the periphery 14, which can be done by means of pressing.

b) A porous anode layer 19 (fuel electrode) composed of a metal/metal-oxide cermet is firmly connected to the fine-grained surface layer of the substrate 2 in the region between the annular channel 5 and the compressed edge region 21, using a thermal process.

c) A ceramic solid electrolyte 17 composed of a doped and stabilized metal oxide which conducts oxygen ions is deposited—covering the anode layer 19 and the rest of the substrate 2.

d) A porous cathode 18 (oxygen electrode) composed, for example, of a doped perovskite is deposited on the electrode 17, corresponding to the area of the fuel electrode.

e) A small separating plate 20 is fitted such that it essentially covers the inner region of the electrolyte which is not covered by the oxygen cathode, but without touching the oxygen cathode.

f) A large separating plate 1 is now placed underneath the substrate 2 such that the channels 7 to 9 are located on the side facing the substrate. This separating plate is formed, for example, as a metal sheet and has corrugations or ribs, so that it forms means running from the inside to the outside for controlled routing of gases. The separating plate may also alternatively be composed of solid material, in which channels are incorporated—by means of metal-cutting machining or erosion processing on one or both sides.

g) In the mutual contact regions close to the opening 3, the large and small separating plates are connected to one another such that they form common apertures 6. FIG. 5 shows a selection of alternative connection options.

h) An electrically conductive corrosion or oxidation protective layer 16 is applied to the side of the large separating plate 1 facing away from the substrate 2, and its surface represents the current collector of the fuel cell on the oxygen side.

2. Low-temperature polymer electrolyte (FIG. 4):

a) A polymer membrane composed, for example, of Nafion (Dupont), which may be used as a polymer electrolyte which conducts hydrogen ions (protons), is processed to a size and shape corresponding to the substrate 2 in FIG. 3. Before assembly, a porous anode layer 19 (fuel electrode) is applied to the lower face of the polymer electrolyte 17, and a porous cathode layer 18 (oxygen electrode) is applied to the upper face, both electrodes preferably being composed of platinum. This is in the region which corresponds to that between the annular channel 5 and the compressed edge region 21 of the substrate 2.

b) A porous or gas-permeable substrate 2 composed, for example, of sintered metal powder, metal fibre felt or metal foam is processed to the desired thickness and shape and represents a current collector (fuel side) with a surface having open pores. These are preferably circular discs, but wafers whose shape is not circular could also be used. The opening 3, the radial channels 4 and the annular channel 5 as well as the apertures 6 are incorporated in the substrate by means of, for example, drilling, milling, pressing or stamping, and the edge region 21 is at least partially compressed in the vicinity of the periphery 14, which can be done by means of pressing.

c) The polymer electrolyte 17, which is coated on both sides as described in a), is applied to the substrate 2 described in b) such that it is located on the side of the substrate 2 which has the channels 4, 5.

d) A small separating plate 20 is fitted such that it essentially covers the inner region of the electrolyte which is not covered by the oxygen cathode, but without touching the oxygen electrode.

e) A large separating plate 1 is now placed underneath the substrate 2 such that the channels 7 to 9 are located on the side facing the substrate. This separating plate is formed, for example, as a metal sheet and has corrugations or ribs, so that it forms means running from the inside to the outside for controlled routing of gases. The separating plate may also alternatively be composed of solid material, in which channels are incorporated—by means of metal-cutting machining.

f) In the mutual contact regions close to the opening 3, the large and small separating plates are connected to one another such that they form common apertures 6. FIG. 5 shows a selection of alternative options for joints.

FIG. 5 shows a selection of alternative joints between the large separating plate 7 and the small separating plate 20. FIG. 5*a* shows a joint by means of soldering or bonding; or—if the polymer electrolyte is being used—by means of a soft seal which is deformed under pressure and is composed of elastic material (for example silicone rubber). FIG. 5*b* shows a welded joint and FIG. 5*c* a joint by means of tubular or hollow rivets. FIG. 5*d* shows a joint in which a portion of the small separating plate 20 is in the form of deep-drawn hollow rivets; the large separating plate 1 could, of course, also be formed in a corresponding manner (not shown). The joints shown in FIGS. 5*a* and 5*b* are also particularly suitable for the forming of apertures 6 which are not designed to be circular and are, for example, oval, kidney-shaped or polygonal.

Figure 6:
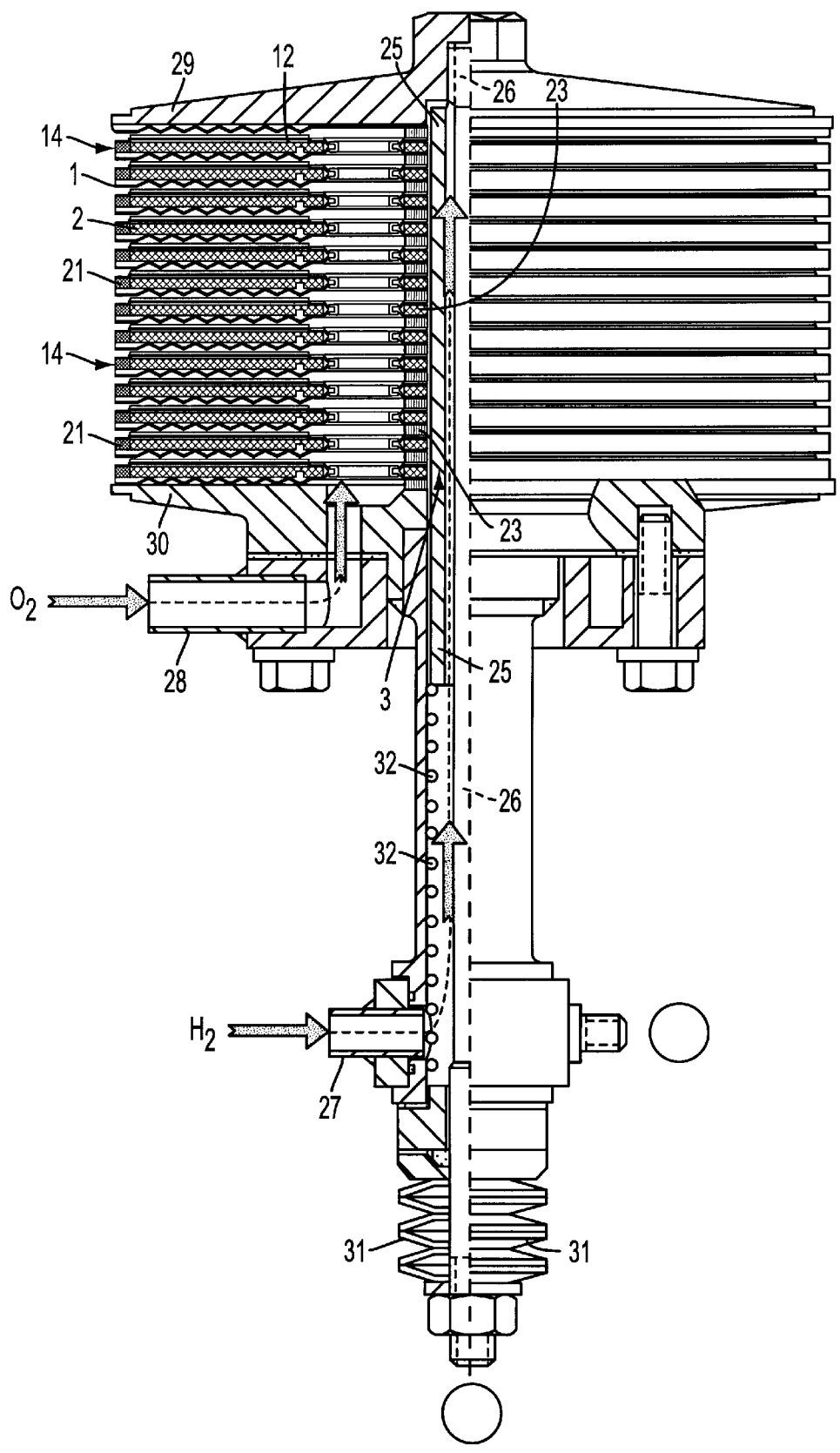
FIG. 6 shows a view and partial section illustration of an assembled arrangement of fuel cells.

FIG. 6 shows a longitudinal section/projection through a fuel cell arrangement. The individual fuel cells, which are circular here, are in this case stacked in a manner corresponding to FIG. 2. The large separating plates 1, the porous or gas-permeable substrates 2, the central opening 3, the front 12, the at least partially compressed edge region 21 and the periphery 14 of the axially, concentrically layered fuel cells are provided with reference numbers. The entire cell stack, in particular the separating plate 1 and the substrate 2, have a continuous central opening 3. In order to ensure the fuel supply, an electrically insulating centring sleeve 25 is provided, which is preferably composed of ceramic material and whose coaxial hole holds the tie rod 26. The annular seals 23 are arranged coaxially with respect to the centring sleeve 25. No additional seals are required on the oxygen side, and the internal supply of the oxygen to the fuel cells is preferably ensured without any seals. The external supply for the fuel (for example methane when using a solid electrolyte or, for example, hydrogen when using a polymer electrolyte) is denoted by 27, and the external supply for the oxygen substrate or the oxygen is denoted by 28. The exposed end plate of the cell stack is denoted by 29. The central tie rod 26, which holds the entire stack together axially, is used for carrying electrical current, and is preferably composed of corrosion-resistant stainless steel. An initial plate 30 is connected to earth and makes direct electrical contact with a protective tube surrounding the centring sleeve, so that the tie rod 26 and the protective tube can be designed as poles for tapping off the wanted current. The tie rod 26 is pre-stressed by means of plate springs 31. In addition, the centring sleeve 25 is always held in the desired position by means of a helical spring 32. The at least one tie rod may have a core which is electrically highly conductive even at high temperatures and is composed, for example, of copper, which is surrounded by a casing of corrosion-resistant material which is resistant to high temperatures. A plurality of tie rods may also be provided. The large separating plate 1 of a fuel cell in this case makes electrical contact with that electrode of its adjacent cell which is located on the side of the electrolyte 17 facing away from the substrate 1.

FIG. 7 shows section illustrations of alternative centring sleeves 25, which can be produced from an electrically insulating material, for example from ceramic. The centring sleeve 25 may have a simple annular cross section (FIG. 7*a*) if it is produced, for example, from a porous gas-permeable material. The first gas, or fuel gas, can then be distributed axially with respect to the fuel cell stack or with respect to the fuel cell arrangement in the central cavity 33 of the centring sleeve and in the space between the tie rod 26 and the inner wall of the centring sleeve 25. The fuel gas can then reach the individual inlet openings 11 of the individual fuel cells through the gas-permeable wall of the centring sleeve 25, whose external circumference essentially fills the opening 3. The cross-sectional shape can or must be chosen to be more complicated if the centring sleeve 25 is composed of a material which is not gas-permeable (FIGS. 7*c* to 7*l*). In addition, it is then advantageous to form holes 34, so that the inlet openings 11 can be supplied with fuel gas as uniformly as possible. The centring sleeve may also be composed of a large number of individual parts which are advantageously and essentially annular, which may be layered one on top of the other axially and may be designed with teeth between them. In order to ensure pressure equalization and thus uniform supply of the inlet openings 11 with fuel gas in the axial direction, the circumference of the centring sleeve 25 may be modified as follows:

Individual (FIG. 7*d*), two (FIG. 7*e*), three (FIG. 7*f*), four (FIG. 7*g*), five (not shown), six (FIG. 7*h*) or more sides 35 may be flattened, resulting in a polygon with a central cavity 33. The outer edges of these polygons are in this case always located on the extreme outer circumference of the centring sleeve 25 in order that it retains its centring function. Alternatively, a multiplicity (for example FIG. 7*j*) of webs 36, but at least three webs 36 (FIG. 7*i*) may be left when the circumference of the centring sleeve is removed. Alternatively or in combination with this, individual grooves 37 (FIG. 7*k*) or a multiplicity of grooves 37 (for example FIG. 7*j*) may also be incorporated. Symmetrically designed centring sleeves (see FIGS. 7*a*, 7*e* to 7*j* and 7*l*) have been proven to be particularly useful owing to the more uniform extent, as a consequence of the heating of the fuel cell arrangement.

In an experimental system, a 2 mm thick nickel felt was used as the porous substrate layer 2, which was coated on the surface with nickel powder such that the three active layers 17, 18, 19 could be deposited in a vacuum, by plasma spraying. The external diameter of these electrolytically active layers was 114 mm, and their internal diameter was 64 mm. The active area was thus about 70 cm². During operation of an individual cell, a power level of about 17 watts was achieved at an operating temperature of 860° C. A stack formed from 20 such cells would provide about 340 watts of electrical power at an operating voltage of 12 volts, in the described fuel cell arrangement and at a comparable operating temperature.

FIGS. 8 to 13 show further preferred embodiments of the fuel cell according to the invention, whose common main feature is a centre part 100 which is offset from the gas-permeable substrate 2, in which case the small separating plate 20 is located on the first surface of this centre part 100, and the large separating plate 1 is located on the second surface of this centre part 100. The material of the substrate 2 (which is, for example, porous) is thus preferably used in the active, annular, outer region of the fuel cell. The inner region, the centre part 100, is, however, preferably formed from solid materials, in accordance with the requirements relating to high resistance to the compression produced by the tie rod. The two regions are connected to one another along a circular separating line by means of soldering, welding or sintering. In addition, the inner region and the outer region can be provided with sealants on the separating surface in between during assembly, and can then be joined together. A seal 110 which prevents the first gas (hydrogen) and the second gas (oxygen in the air) from mixing is preferably arranged in each case between two adjacent cells and essentially concentrically with respect to the opening 3 in a fuel cell arrangement or in a fuel cell stack. The preferred design for use in fuel cells will now be described with reference to exemplary embodiments 2 to 7, although this should not be regarded as any limitation:

Embodiment 2

Figure 8A:
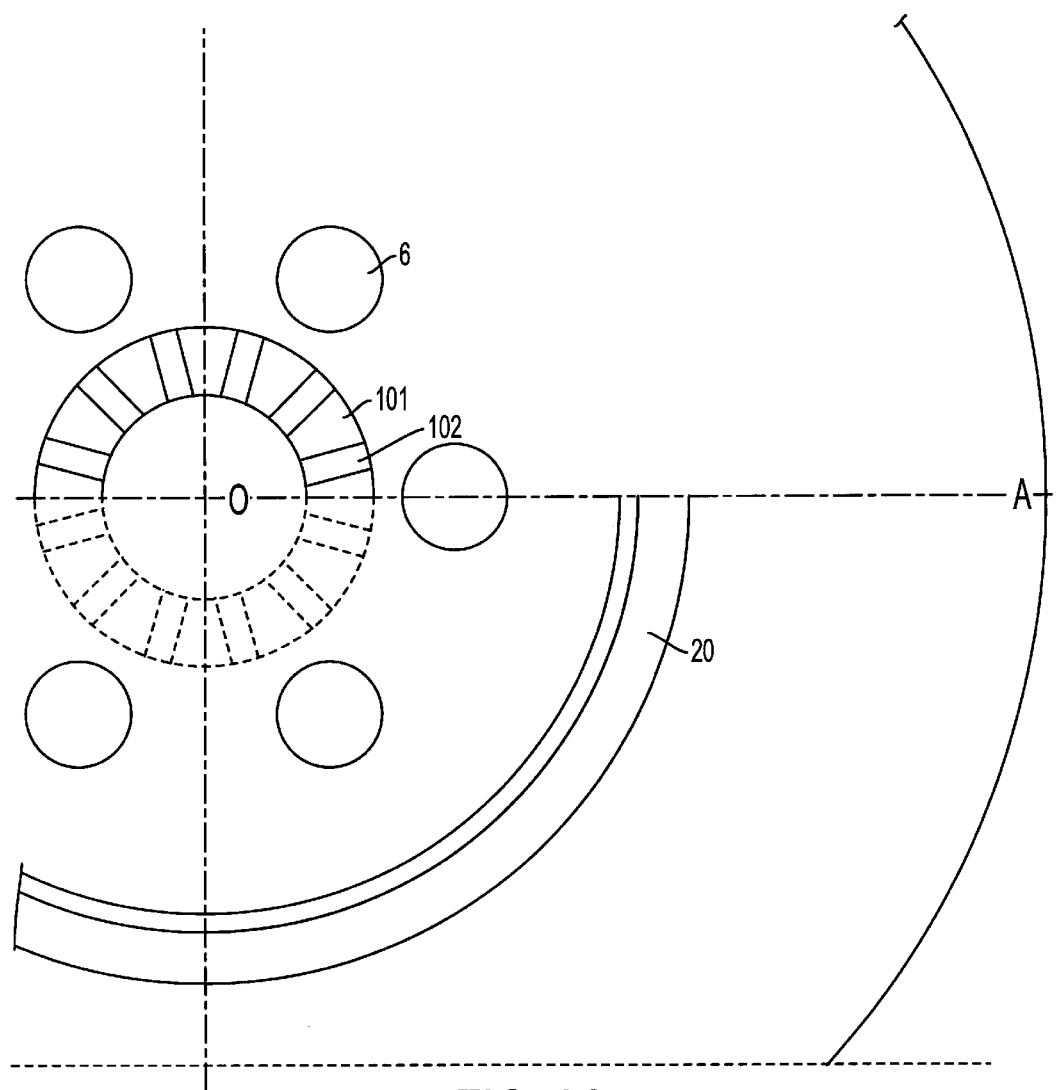
FIGS. 8a, 9a, 10a, 11a, 12a, and 13a each show a plan view of a part of the large or small separating plate of a fuel cell in combination with a gas-permeable substrate on it, corresponding to a second to a seventh embodiment.
Figure 8B:
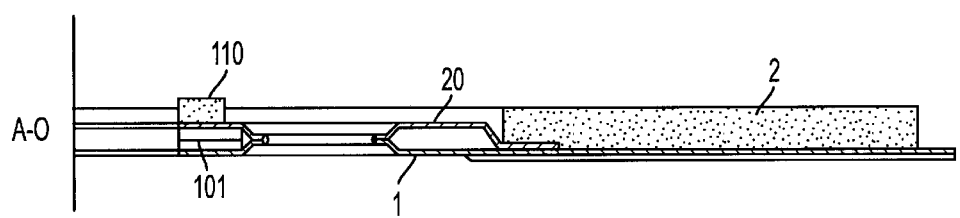
FIGS. 8b, 9b, 10b, 11b, 12b, and 13b each show a section illustration of a fuel cell along the section line A-O in FIGS. 8a, 9a, 10a, 11a, 12a, and 13a, respectively.

As can be seen from FIG. 8, the fuel gas $H_2$ is passed through from the opening 3 between the large separating plate 1 and the small separating plate 20 to the gas-permeable or porous layer of the substrate 2. The $H_2$ flow is passed at the edge of the centre part 100, which is in this case forms the front 12, towards the region of the large separating plate 1, where the inlet-flow channels 7 start. The fuel gas is then effectively and uniformly distributed via this to the active, annular outer region of the fuel cell. In order to absorb the contact pressure which is required for reliable sealing between two adjacent fuel cells, a gas-permeable supporting ring 101 is arranged around the central opening 3 and between the large and small separating plates. This supporting ring 101 may be composed of porous sintered material; however, it may also be manufactured from solid metal into which grooves 102, which are radial with respect to the flow direction, are incorporated. In the region where the two separating plates are in contact and the axial apertures 6 are provided for the oxygen in the air, the two separating plates are soldered, welded or riveted to one another such that they are gas-tight. On its outer circumference, the small separating plate 20 is also mechanically connected to the large separating plate 1, although this is preferably in such a manner that the fuel gas can essentially enter the inlet-flow channels 7 uniformly. The gas-permeable or porous substrate layer 2 is fitted to this plate assembly 1, 20, 101, and is preferably soldered to it.

Embodiment 3

Figure 9A:
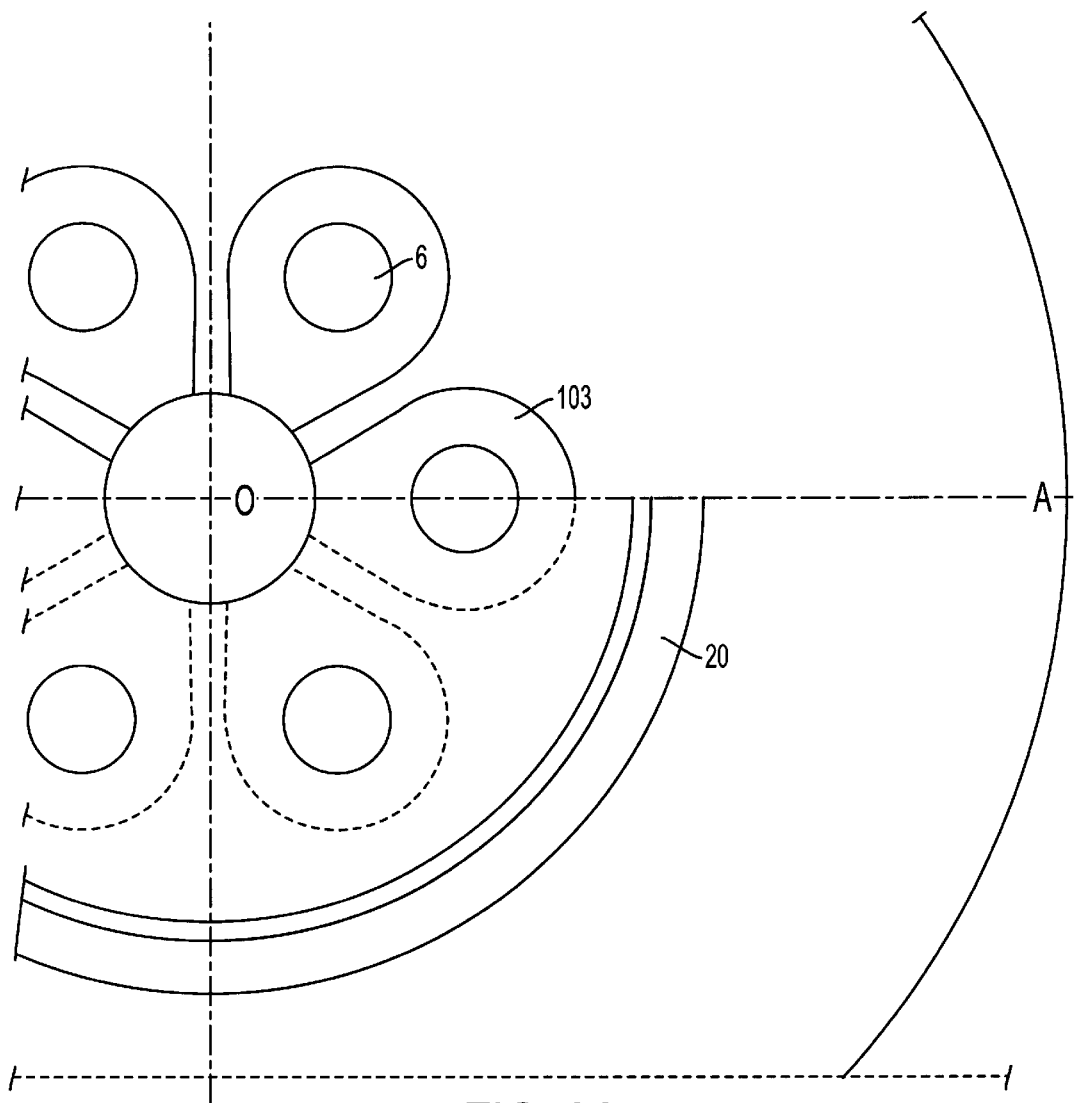
Figure 9B:
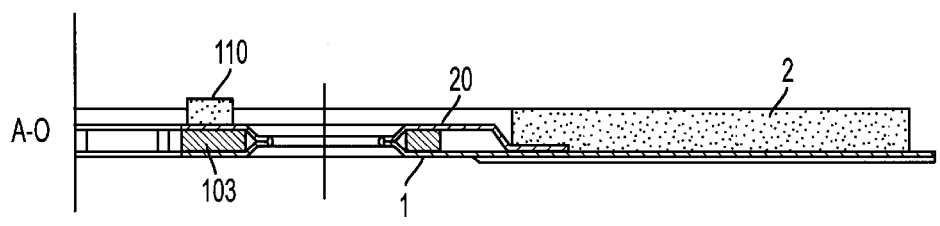

As can be seen from FIG. 9, a sheet-metal part 103 is used instead of the supporting ring 101 for each aperture 6, and is soldered or welded flat to the two separating plates 1, 20. This results in a radial channel 4 between each two apertures 6, in order to supply the fuel gas $H_2$ from the opening 3 to the circular channel 5. The inward-pointing flaps of these sheet-metal parts are used to support the separating plates 1, 20 in the sealing region, which is loaded in compression. The gas-permeable substrate layer 2 is combined with the plate assembly 1, 20, 103, as in the 2nd embodiment.

Embodiment 4

Figure 10A:
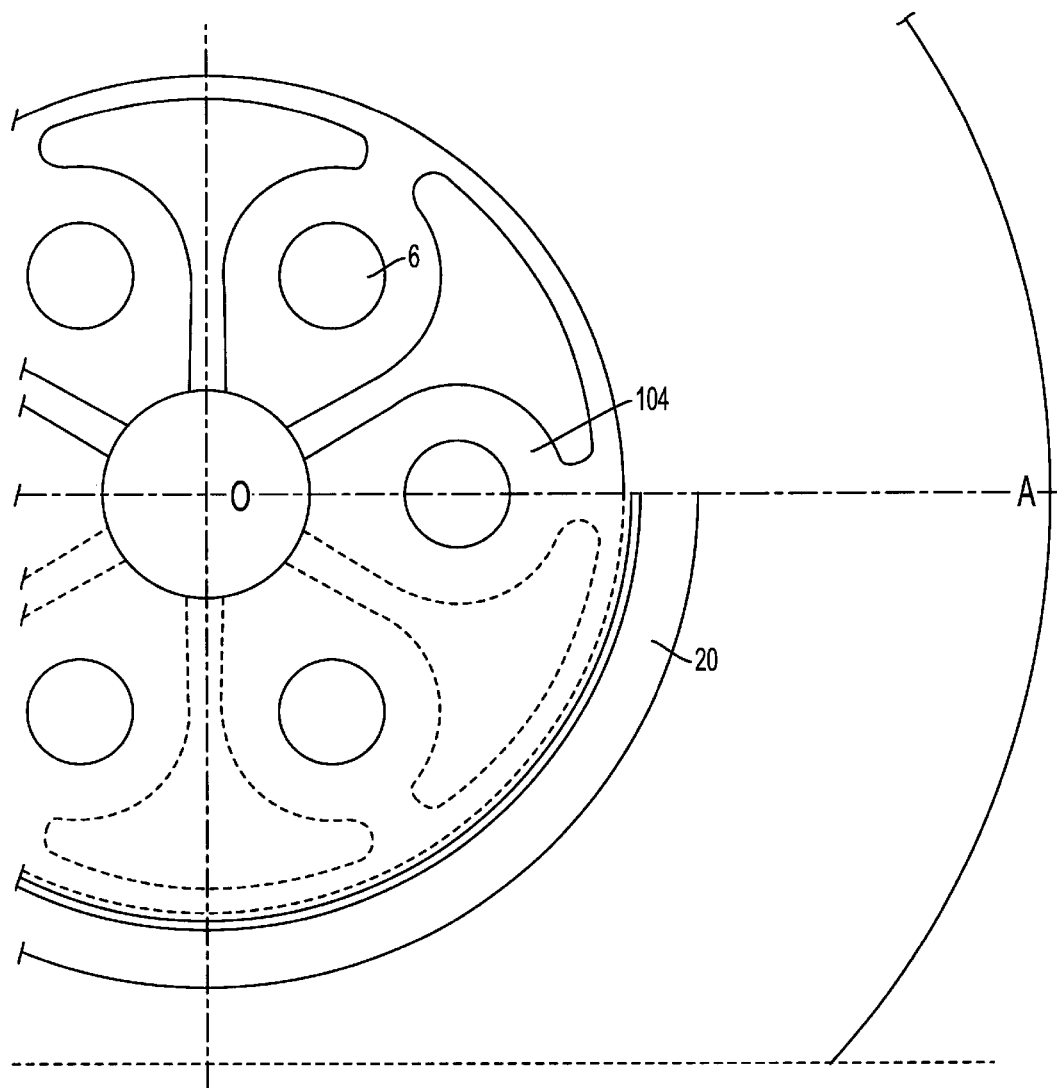
Figure 10B:
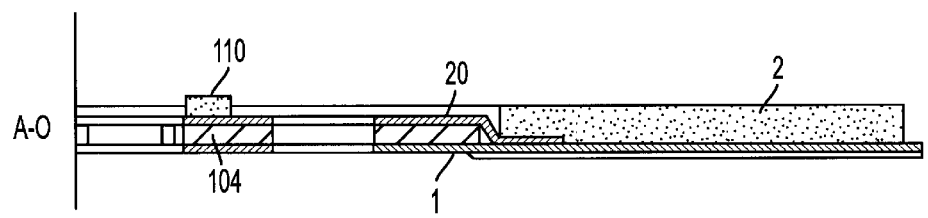

As can be seen from FIG. 10, the sheet-metal parts 103 have in this case been combined to form a single component 104: each of the perforated elements, which corresponds to the sheet-metal parts 103, is connected on the outside via a lengthened region in the form of strut to a connecting ring which combines all the sheet-metal parts 103 to form a structural unit 104, and forms the front 12. Intermediate spaces are thus provided, via which the fuel gas $H_2$ can reach the inlet-flow channels 7 which are incorporated in the large separating plate 1. The gas-permeable substrate layer 2 is combined with the plate assembly 1, 20, 104, as described in the 2nd embodiment.

Embodiment 5

Figure 11A:
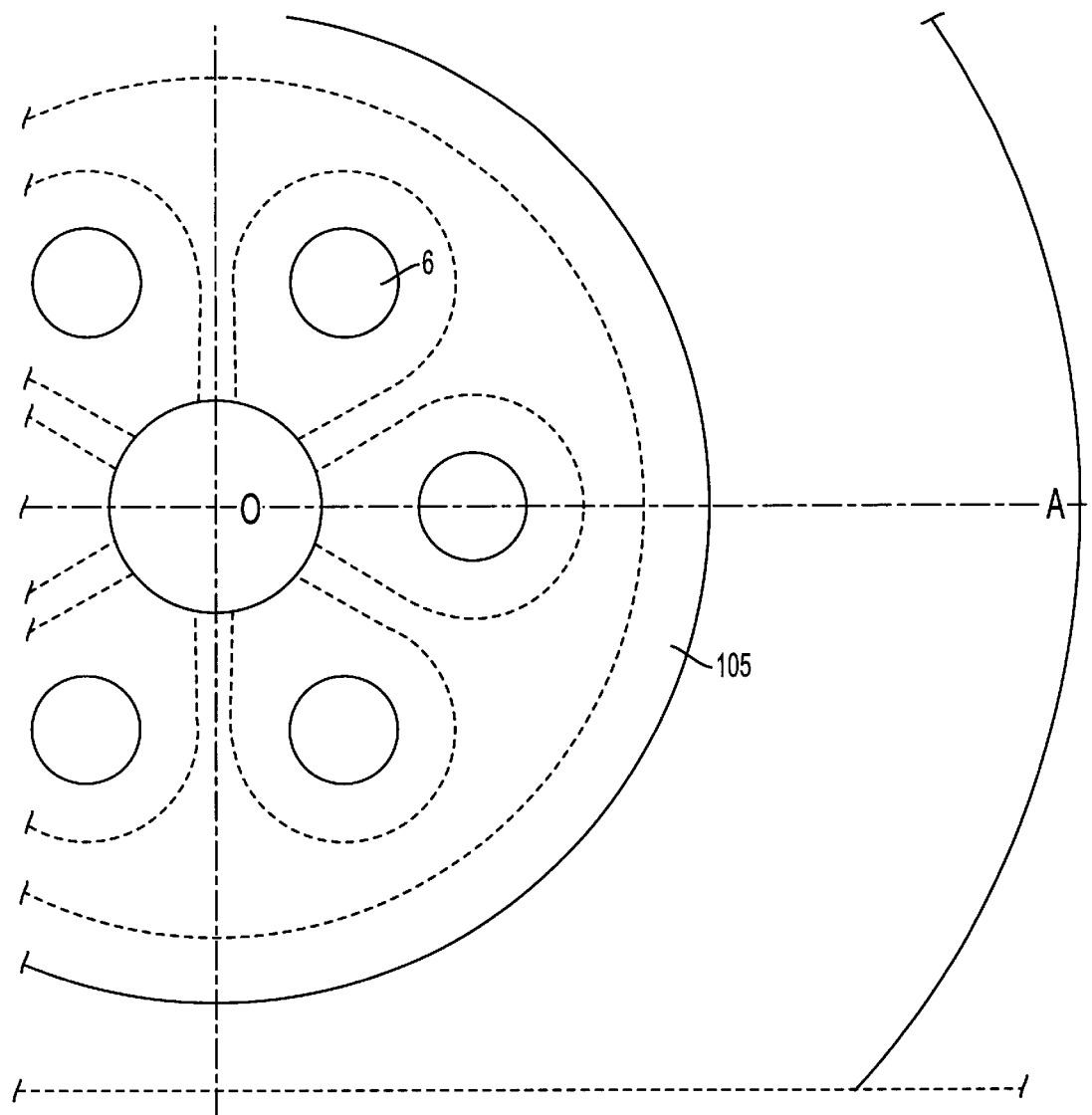
Figure 11B:
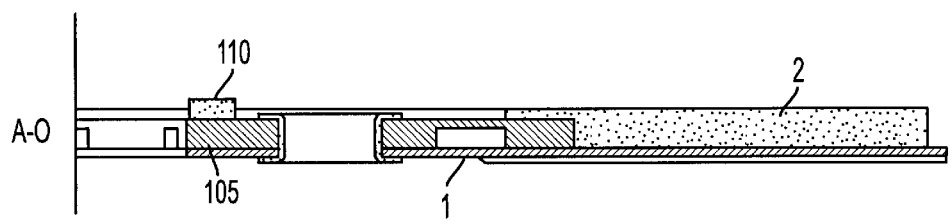

As shown in FIG. 11, the component 104 is in this case combined in the centre part 100 of the substrate 2 with the channel structures 4, 5 and the small separating plate 20 in a single forged or pressed part 105. There are two ways to assemble a fuel cell corresponding to this fifth embodiment:

a) The pressed part 105 is soldered to the porous substrate layer 2, after which this combination 2, 105 is connected to the large separating plate 1 by means of tubular rivets in the region of the apertures 6.

b) The riveting of the pressed part 105 and the large substrate plate 1 is carried out first of all. The annular and porous substrate layer 2, which has already been coated with the electrolyte 17, is inserted—preferably with sealants being added during the assembly of a fuel cell stack.

The design described here allows the use of very thin, corrosion-resisted sheet metal, which can be closely joined, for the large separating plate 1.

Embodiment 6

Figure 12A:
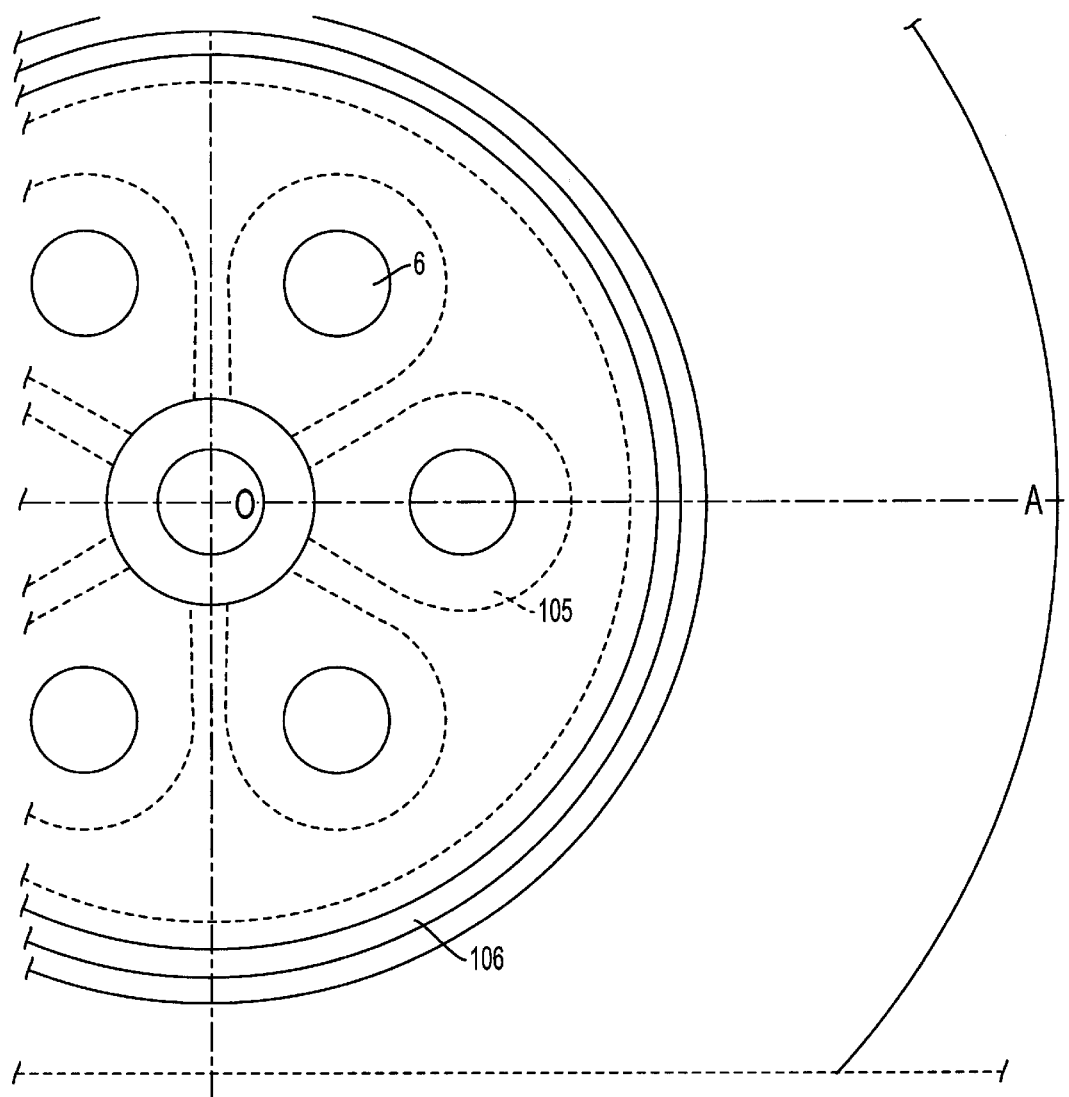
Figure 12B:
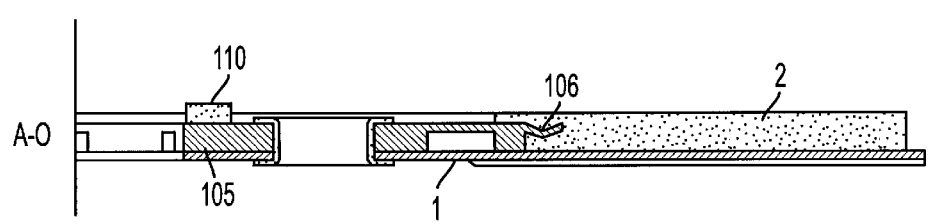

As shown in FIG. 12, the component 104 is in this case likewise combined in the centre part 100 of the substrate 2 with the channel structures 4, 5 and the small separating plate 20 in a single forged or pressed part 105. In addition, on its outer edge, this pressed part 105 has a thin laminate 106. The metal powder for the porous substrate layer 2 (which can in this case be produced from sintered metal) is pressed around this laminate. The forged part 105 is thus mechanically connected to the gas-permeable substrate layer 2 in one process. During final assembly, the disc assembly 2, 105 is connected to the large separating plate 1, preferably by means of tubular rivets in the region of the apertures 6.

Embodiment 7

Figure 13A:
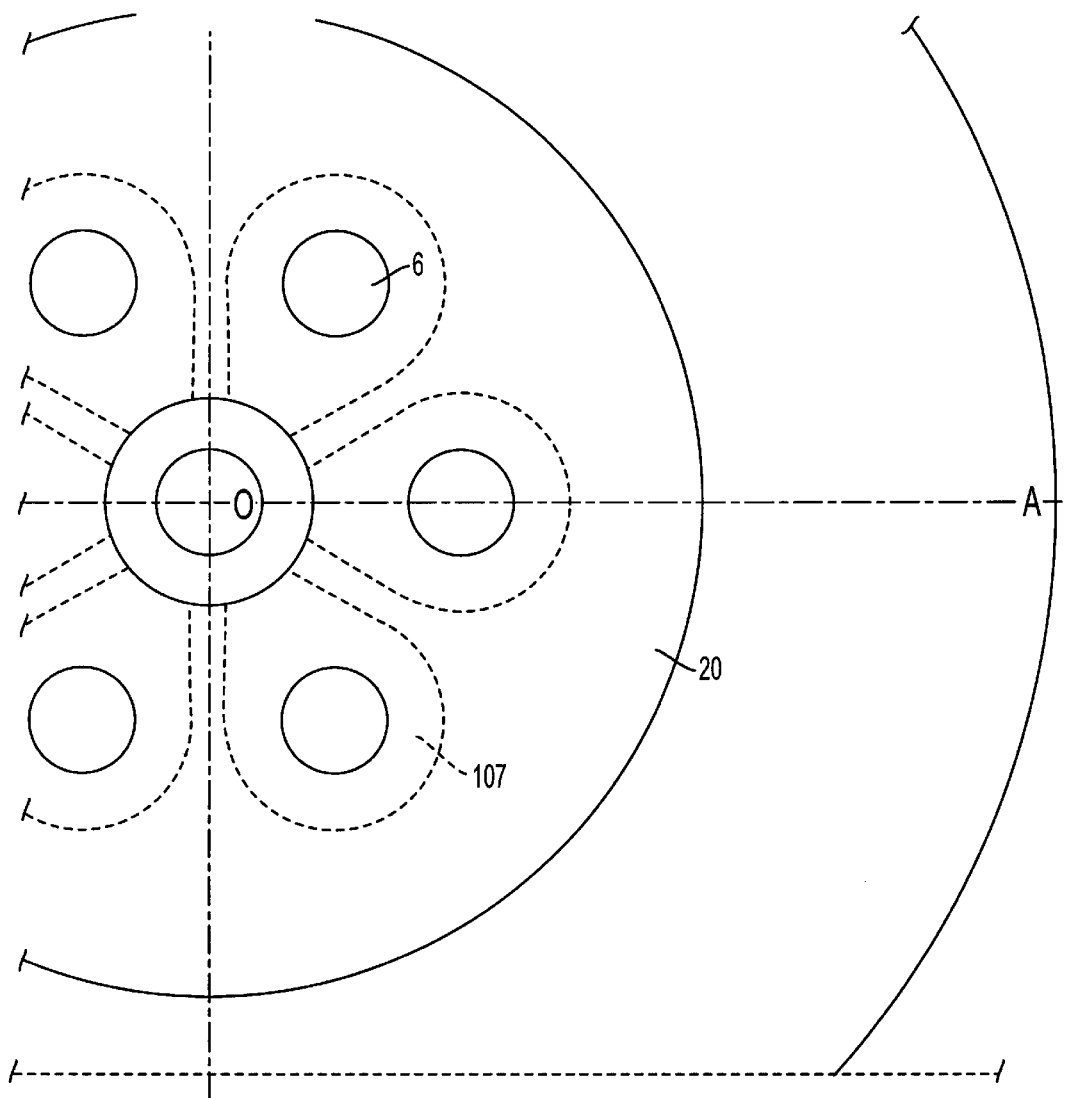
Figure 13B:
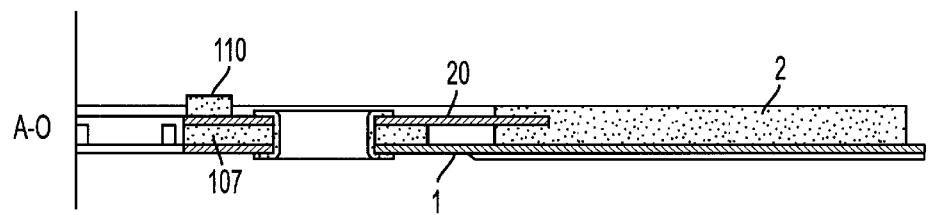

As is shown in FIG. 13, the small separating plate 20 (which is manufactured from sheet metal) is in this case sintered into the porous substrate layer 2 in the centre part 100 of the gas-permeable substrate 2. In the same operation of sintering the metal powder for the substrate layer 2, the channels 4, 5 which carry the flow are cut out in the metal powder 107 on the lower face of the small separating plate 20, this metal powder 107 likewise being sintered to the small separating plate 20 in the central region 100. The entire disc assembly 2, 20, 107 is thus produced in one operation. Once the electrochemical layer has been applied, in the same way as in the sixth embodiment as well, the disc assembly 2, 20, 107 is connected to the large separating disc 1 by means of tubular rivets in the region of the apertures 6.

The novel fuel cell arrangement can be produced to be very simple, robust, light and cost-effective in comparison to known arrangements. Examples of applications of fuel cell arrangements according to the invention include:

Portable electricity generators for direct-current supplies for vehicles, boats, aircraft, building sites and mountain huts.

Small systems for simultaneously generating electricity and heat.

Driving motor vehicles, in which case (with appropriate pre-treatment) even liquid fuels such as methanol, lead-free petrol or diesel fuel could be used.

The advantages of the invention include:

Thermal inertia is undesirable for all of these applications. Owing to its low weight, the fuel cell arrangement described here can, however, be raised very quickly to the desired operating temperature, and can then be operated with short control response times.

A novel design of the individual cells comprising only three parts (large separating plate 1 and small separating plate 20 as well as porous substrate 2 with active layer) allows extreme geometrical simplicity, which leads to cost-effective mass production, and to robustness of the individual element.

The simple construction allows the use of a single, commercially available seal composed of compressed ceramic fibres or mica in the hot region.

The arrangement of a single tie rod 26 in the reducing environment of the fuel supply avoids oxidation of electrical contacts and—in combination with a centring sleeve 25—allows the fuel to circulate freely in the interior region of the stack.

The design of the tie rod 26 as an electrically live element allows the electricity to be carried from the exposed end plate 29 to the exterior with low losses.

The earth contact is provided by a connection from the fixed initial plate 30 to the housing, rendering a second electrical bushing superfluous.

The configuration in the form of corrugations, grooves or studs, in particular the configuration of the curved corrugations as involutes with equal intervals between two adjacent corrugations, allows—irrespective of the particular radius of the large separating plate 1—a controlled flow of fuel and of the oxidant. Such optimized gas supply minimizes electrical losses.

The design is preferably symmetrical about the centre and thus ensures optimum robustness of the fuel cell arrangement while avoiding local stress centres. In this case, the individual fuel cells can be constructed such that their rotation direction—in each case governed by the large separating plate 1—is the same in all the fuel cells or is aligned to be clockwise and anticlockwise alternately in the stack.

What is claimed is:

1. A fuel cell in the form of a disc for axial layering in a stack fixed by a tie rod, wherein the fuel cell defines an opening to hold the tie rod and to form an inlet for a first gas, wherein the fuel cell has a periphery, the fuel cell comprising:

an ion-conducting electrolyte having an inner region and a first side and a second side, the ion-conducting electrolyte being one of a high-temperature ceramic electrolyte and a low-temperature polymer electrolyte;

a porous cathode layer as an oxygen electrode on the first side of the ion-conducting electrolyte, and a porous anode layer as a fuel electrode on the second side of the ion-conducting electrolyte;

a gas-permeable substrate having a first and a second surface and having substrate channels for carrying gases;

a small separating plate smaller than said substrate located at least partially on the first surface of the substrate and essentially covering the inner region of the first side of the ion-conducting electrolyte not covered by the cathode;

a large, electrically conductive separating plate, larger than said smaller plate located on the second surface of the substrate and including means for carrying gases in a controlled manner, wherein said gases interact with the substrate channels.

2. The fuel cell according to claim 1, wherein the ion-conducting electrolyte is arranged on the first surface of the substrate, wherein the substrate is at least partially compressed on the periphery, and wherein the small separating plate and the large separating plate have at least one mutual contact region adjacent to the opening and, in the contact region, define at least one aperture for passing a second gas in an axial direction.

3. The fuel cell according to claim 1, wherein the means for carrying gases of the large separating plate comprise large separating plate channels that have a front region, and wherein the substrate channels distribute a first gas supplied in the opening over the front region of the large separating plate channels.

4. The fuel cell according to claim 1, wherein the substrate includes a center part offset in height and having a first and second surface, wherein the small separating plate is located on the first surface of the center part, and wherein the large separating plate is located on the second surface of the center part.

5. The fuel cell according to claim 4, wherein the ion-conducting electrolyte is arranged on the first surface of the substrate, wherein the substrate is at least partially compressed on the periphery, and wherein the small separating plate and the center part are manufactured from one piece having gas line channels and at least one aperture to carry a second gas in an axial direction.

6. The fuel cell according to claim 3, wherein the large separating plate channels comprise, on the side facing the substrate, inlet-flow channels for carrying the first gas in a controlled manner, said inlet-flow channels starting abruptly in the front region for transferring the first gas from the front region in a controlled manner toward the periphery of the fuel cell.

7. The fuel cell according to claim 6, wherein the substrate includes a diffusion zone, and wherein the inlet-flow channels of the large separating plate channels have ends that end outside of the diffusion zone.

8. The fuel cell according to claim 7, wherein the large separating plate channels further include outlet-flow channels for carrying the first gas in a controlled manner, the outlet-flow channels starting within the diffusion zone, at a distance from the inlet-flow channels, and ending open at the periphery of the fuel cell.

9. The fuel cell according to claim 8, wherein the large separating plate channels further include pressure-equalizing channels arranged between and at a distance from the inlet-flow channels and outlet-flow channels, the pressure-equalizing channels starting inside of the diffusion zone and ending outside of the diffusion zone.

10. The fuel cell according to claim 9, wherein the large separating plate channels further include, facing away from the substrate, through-channels for carrying the second gas in a controlled manner.

11. The fuel cell according to claim 1, wherein the means for carrying gases in a controlled manner run along continuous lines without branches and do not run either in a radial direction or in a tangential direction.

12. The fuel cell according to claim 1, wherein the means for carrying gases in a controlled manner each run along lines described by a formula $\phi=+A\{[(r/r_0)^2-1]^{0.5}-B \arctan[(r/r_0)^2-1]\}$, wherein A>0 and B>0, wherein all the lines run in one rotation direction within a fuel cell, and wherein $\phi$=angle measured from a reference line passing through the origin, r=variable radius, measured from the origin, and $r_o$=reference radius, measured from the origin.

13. The fuel cell according to claim 12, wherein A<2 and [0<]B<2.

14. The fuel cell according to claim 12, wherein A=1 and B=1.

15. The fuel cell according claim 12, wherein the means for carrying gases in a controlled manner run along at least one of continuous and non-continuous lines which approximate the curve which is described by the formula.

16. An arrangement of fuel cells, comprising:

a plurality of fuel cells, each of the fuel cells having a periphery and comprising an ion-conducting electrolyte having an inner region and a first and second side, the ion-conducting electrolyte being one of a high-temperature ceramic electrolyte and a low-temperature polymer electrolyte;

a porous cathode layer as an oxygen electrode on the first side of the ion-conducting electrolyte, and a porous anode layer as a fuel electrode on the second side of the ion-conducting electrolyte;

a gas-permeable substrate having a first and a second surface and having substrate channels for carrying gases;

a small separating plate smaller than said substrate located at least partially on the first surface of the substrate and essentially covering the inner region of the first side of the ion-conducting electrolyte not covered by the cathode, and a large, electrically conductive separating plate larger than said smaller plate located on the second surface of the substrate and includes means for carrying gases in a controlled manner, wherein said gases interact with the substrate;

an initial plate and an end plate;

at least one tie rod, said at least one tie rod acting between the initial plate and the end place; and at least one electrically insulating centering sleeve surrounding each at least one tie rod, wherein the fuel cells are layered axially in a stack fixed by the at least one tie rod in an opening in the fuel cells, wherein the at least one tie rod and the at least one electrically insulating centering sleeve define a first space such that the first gas can flow through the first space, and wherein the at least one electrically insulating centering sleeve and the edge of a channel formed by the openings in the stack of fuel cells form a second space such that the first gas can flow through the second space, wherein the relatively small separating plate and large separating place of each fuel cell have at least one mutual contact region and define at least one aperture forming a third space such that the second gas can flow through the third space, said apertures of adjacent fuel cells being placed one above each other in a grid in opposite contact regions of the small separating plates and the large separating plates of adjacent fuel cells.

17. An arrangement of fuel cells, comprising:

a plurality of fuel cells, each of the fuel cells having a periphery and comprising an ion-conducting electrolyte having an inner region and a first and second side, the ion-conducting electrolyte being one of a high-temperature ceramic electrolyte and a low-temperature polymer electrolyte;

a porous cathode layer as an oxygen electrode on the first side of the ion-conducting electrolyte, and a porous anode layer as a fuel electrode on the second side of the ion-conducting electrolyte;

a gas-permeable substrate having a first and a second surface and having substrate channels for carrying gases;

a small separating plate smaller than said substrate located at least partly on the first surface of the substrate and essentially covering the inner region of the first side of the ion-conducting electrolyte not covered by the cathode, a large, electrically conductive separating plate larger than said smaller plate located on the second surface of the substrate and includes means for carrying gases in a controlled manner, wherein said gases interact with the substrate, wherein the substrate includes a center part offset in height and having a first and second surface, wherein the small separating plate is located on the first surface of the center part, and wherein the large separating place is located on the second surface of the center part, and wherein the ion-conducting electrolyte is arranged on the first surface of the substrate, wherein the substrate is at least partially compressed on the periphery, and wherein the small separating place and the center part are manufactured from one piece having gas line channels and at least one aperture in order to carry a second gas in an axial direction;

an initial plate and an end plate;

at least one tie rod, said at least one tie rod acting between the initial plate and the end place; and at least one electrically insulating centering sleeve surrounding each at least one tie rod, wherein the fuel cells are layered axially in a stack fixed by at least one tie rod in an opening in the fuel cells, wherein the at least one tie rod and the at least one electrically insulating centering sleeve define a first space such that the first gas can flow through the first space and wherein the at least one electrically insulating centering sleeve and the edge of a channel formed by the openings in the stack of fuel cells form a second space such that the first gas can flow through the second space, wherein the apertures formed in the center part of the substrate form a third space, wherein the second gas can flow through the third space, said apertures of adjacent fuel cells being placed one above each other in a grid.

18. The arrangement according to claim 16, wherein each of the fuel cells have a rotation direction, wherein the fuel cells are stacked such that each fuel cell has at least one adjacent cell, wherein the rotation direction of all the gas-carrying means in each fuel cell is opposite the rotation direction of at least one of the adjacent cells.

19. The arrangement according to claim 18, further comprising a seal being arranged between adjacent fuel cells essentially concentrically with respect to the openings to prevent the first gas and the second gas from nixing.

20. The arrangement according to claim 16, wherein the large separating plate in each fuel cell makes electrical contact with an electrode in the adjacent fuel cell located on the side of the ion-conducting electrolyte facing away form the substrate.

21. The arrangement according to claim 20, further comprising a protective tube surrounding the centering sleeve, wherein the end plate is electrically connected to the at least one tie rod to carry current away, and wherein the initial plate is connected to earth and makes direct electrical contact with the protective tube surrounding the centering sleeve, whereby the tie rod and the protective tube can be designed as poles to tap off wanted current.

22. The arrangement according to claim 16, wherein the at least one tie rod has a core which is electrically highly conductive even at high temperatures and is surrounded by a casing composed of a material which is resistant to corrosion and high temperatures.

23. A method for producing the fuel cell defined in claim 1 comprising the steps of providing the ingredients recited therein.

24. A method for producing the arrangement of fuel cells defined in claim 16 comprising the steps of providing the ingredients recited therein.

* * * * *